R. POLIAKOFF.
MILLING MACHINE DYNAMOMETER.
APPLICATION FILED FEB. 14, 1918.
1,280,538.
Patented Oct. 1, 1918.
5 SHEETS—SHEET 1.
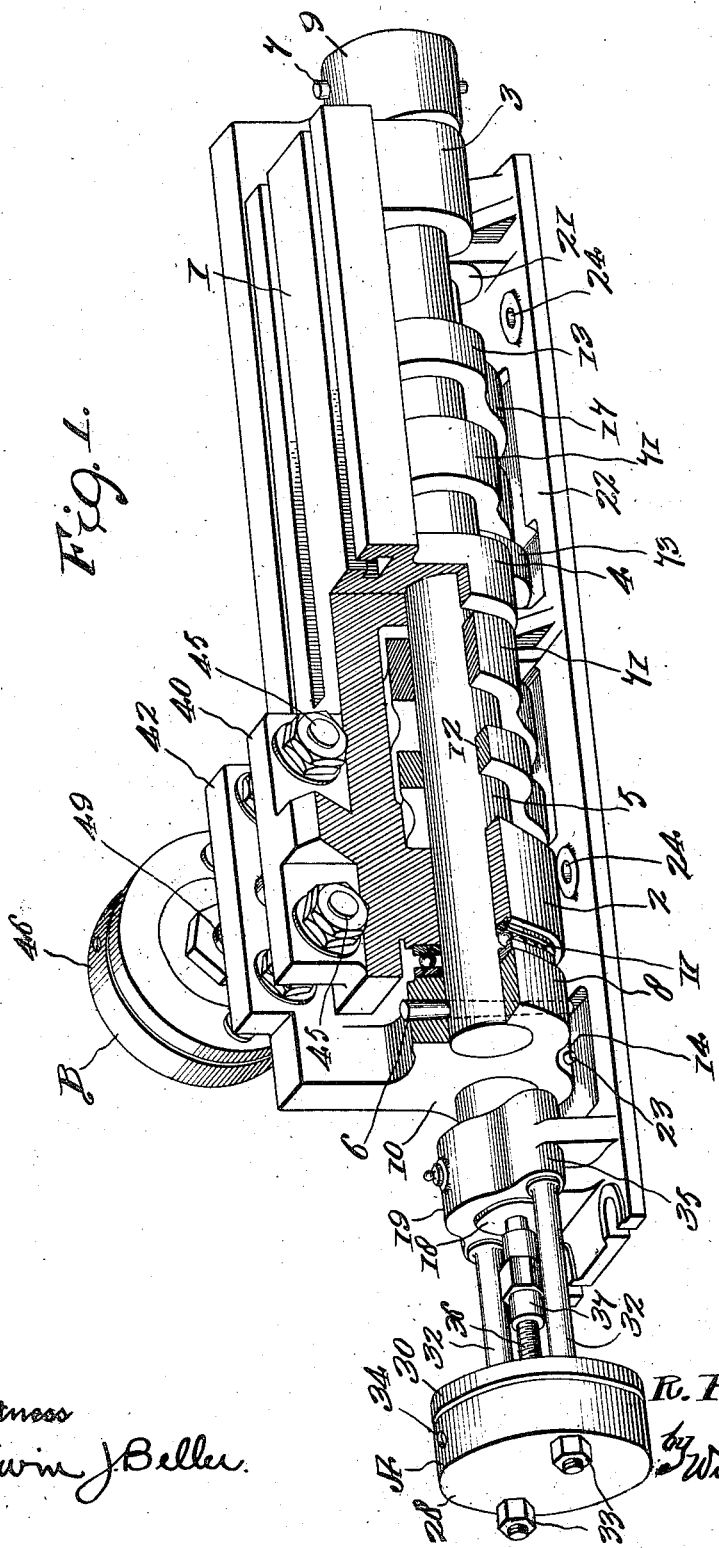

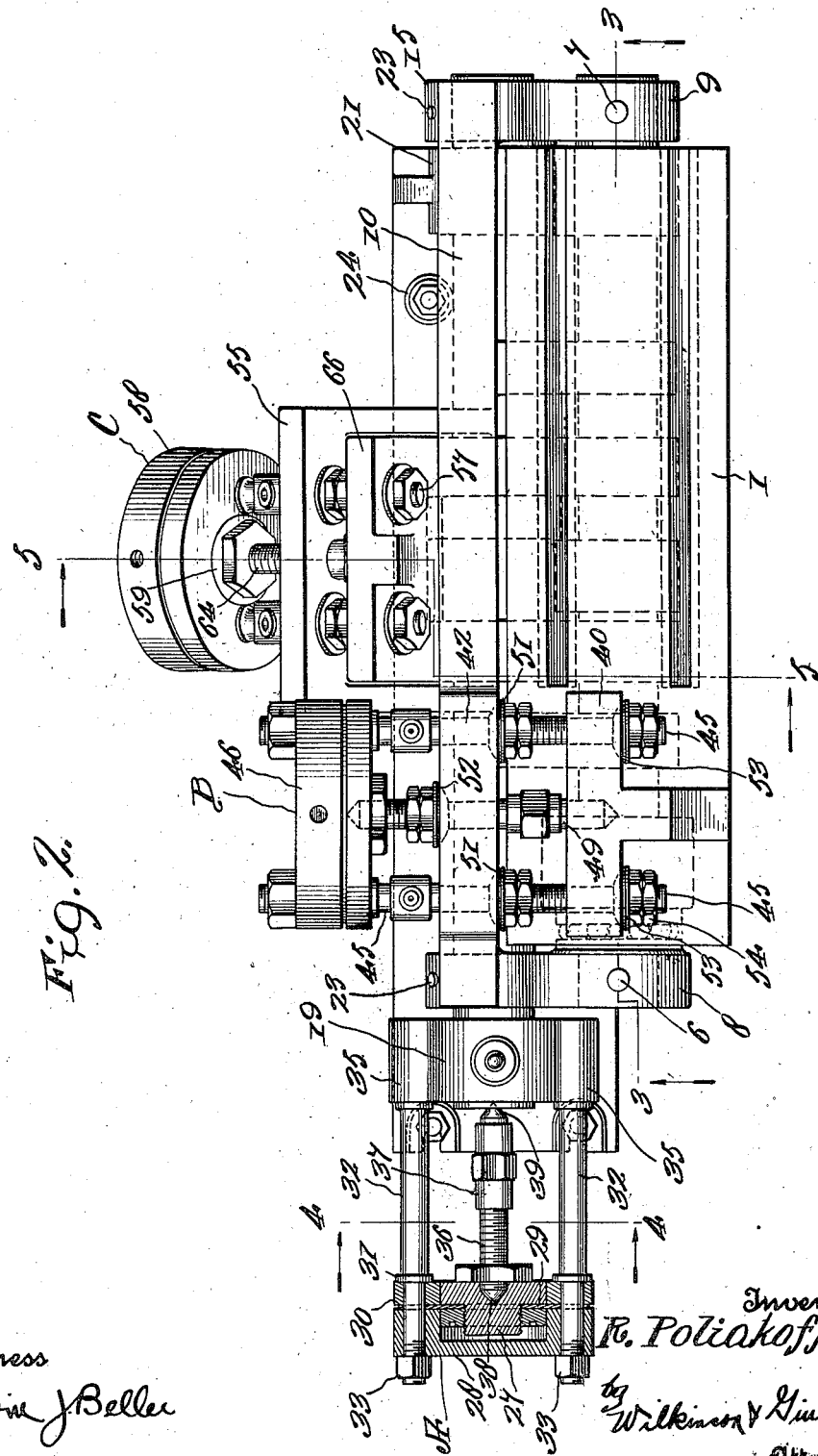

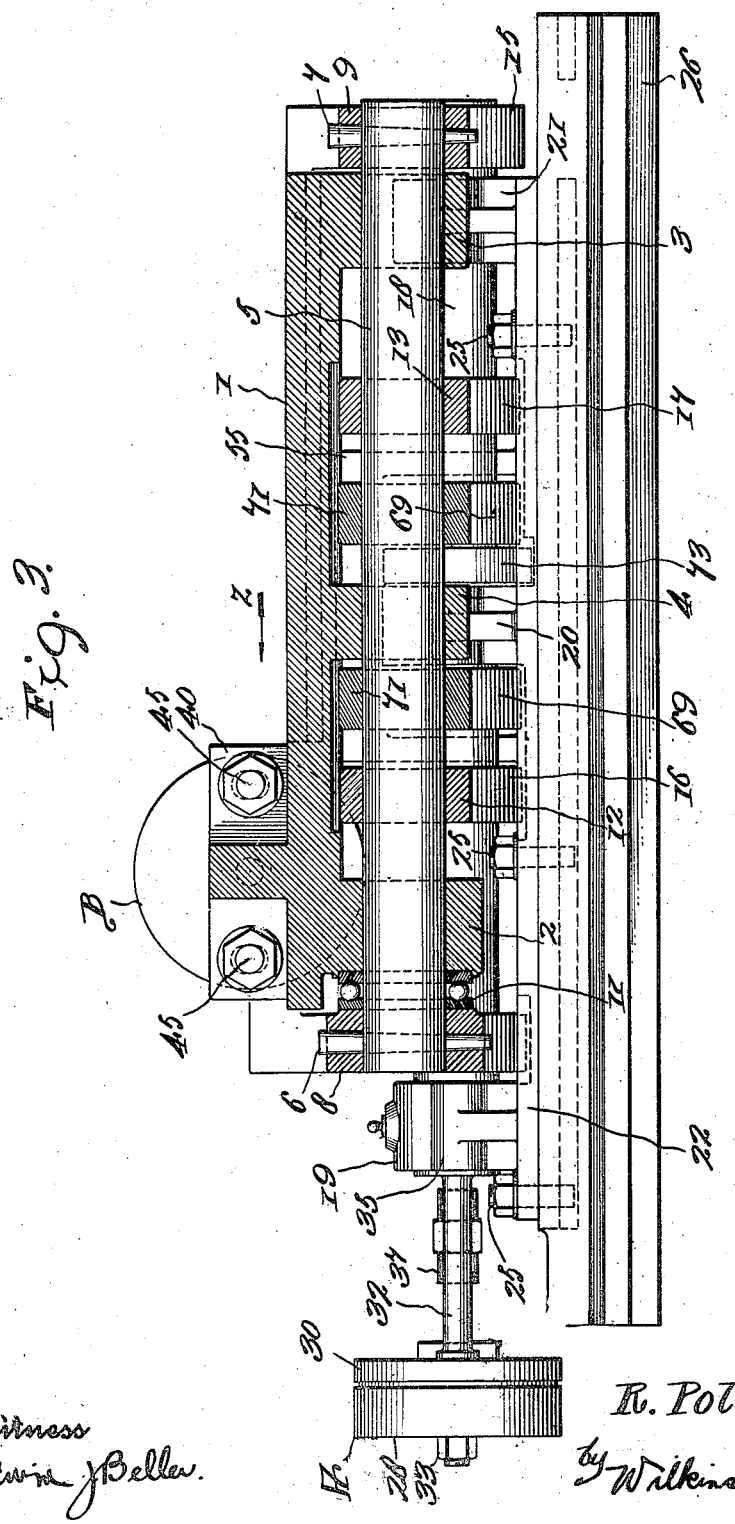

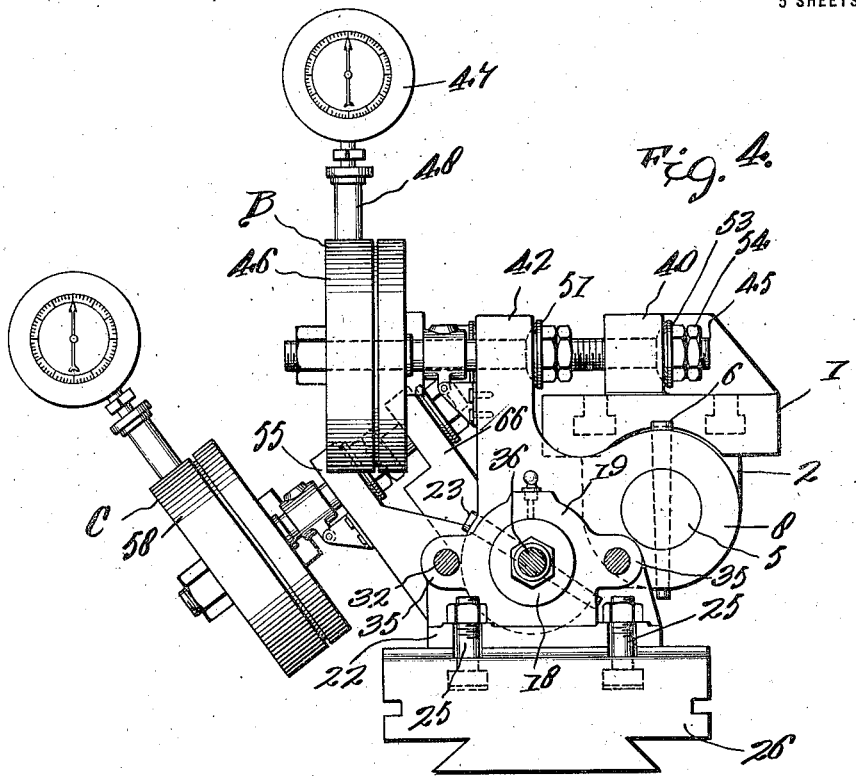
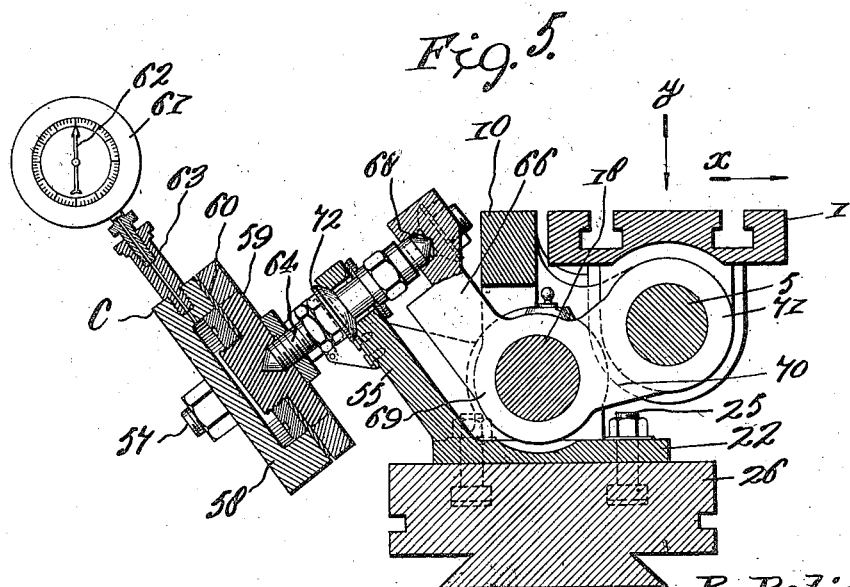

R. POLIAKOFF.
MILLING MACHINE DYNAMOMETER.
APPLICATION FILED FEB. 14, 1918.
1,280,538.
Patented Oct. 1, 1918.
5 SHEETS—SHEET 5.
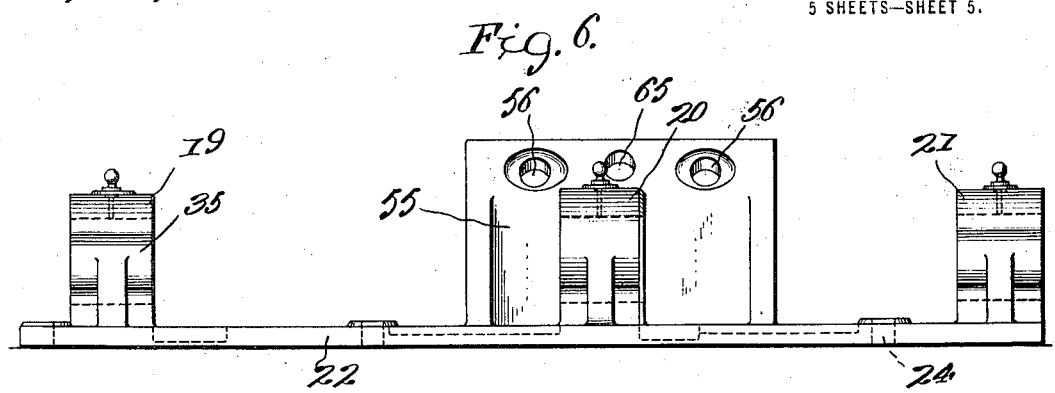
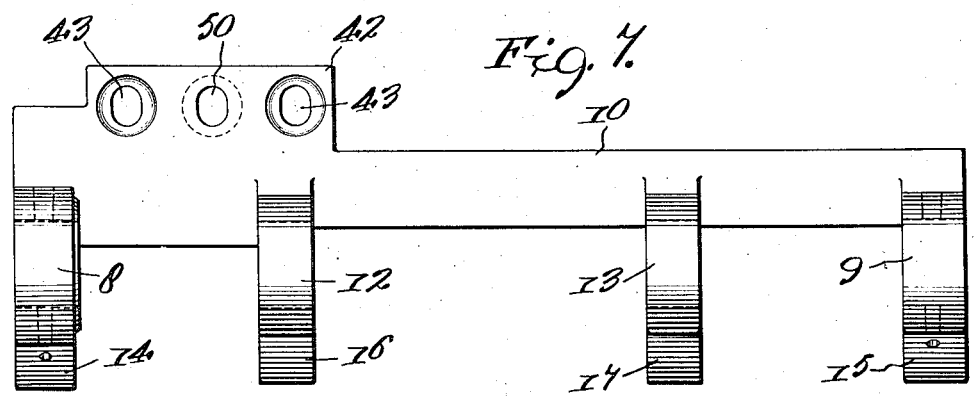
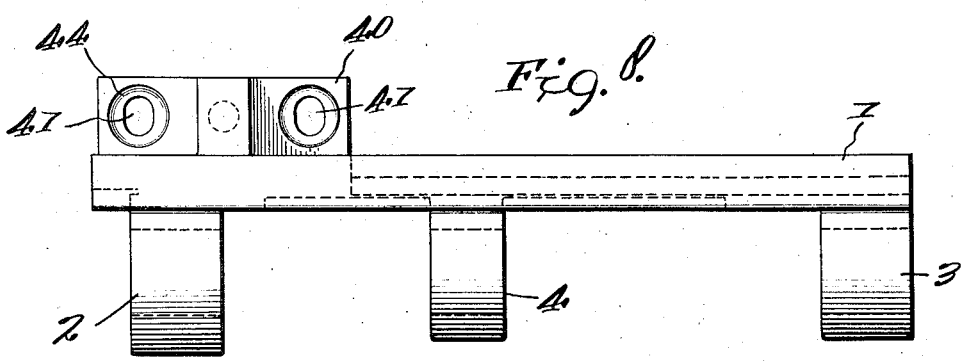
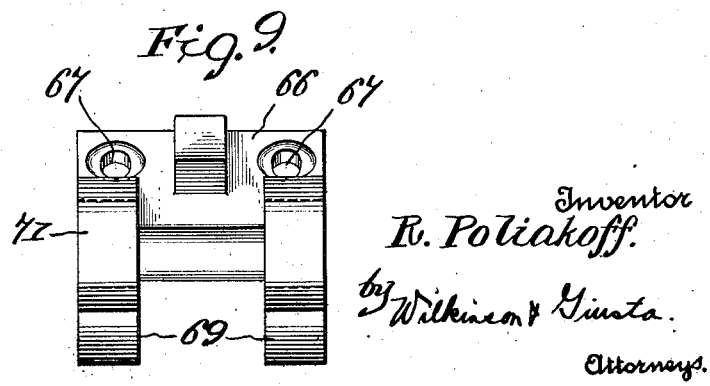
Witness
Edwin J Beller
Inventor
R. Poliakoff.
by Wilkinson & Giusta.
Attorneys.

UNITED STATES PATENT OFFICE.

ROUVIME POLIAKOFF, OF NEW YORK, N. Y.

MILLING-MACHINE DYNAMOMETER.

1,280,538.  Specification of Letters Patent.  Patented Oct. 1, 1918.

Application filed February 14, 1918. Serial No. 217,091.

*To all whom it may concern:*

Be it known that I, ROUVIME POLIAKOFF, a citizen of Russia, residing at New York, in the county of New York and State of New York, have invented certain new and useful Improvements in Milling-Machine Dynamometers; and I do hereby declare the following to be a full, clear, and exact description of the invention, such as will enable others skilled in the art to which it appertains to make and use the same.

The present invention relates to improvements in milling machine dynamometers, and has for its object the measuring of the cutting pressures that the milling cutter exerts on the work, and through the work on the various parts of the milling machine for the purpose of ascertaining such pressures for use in determining the strength required of the milling machine parts.

In the accompanying drawings forming a part of this application, and in which similar reference symbols indicate corresponding parts in the several views:

Figure 1 is a perspective view of a dynamometer constructed in accordance with the present invention, and with parts cut away.

Fig. 2 is a top plan view of the same with one of the gages shown in section.

Fig. 3 is a vertical sectional view taken on the line 3—3 in Fig. 2.

Fig. 4 is a cross sectional view taken on the line 4—4 in Fig. 2.

Fig. 5 is another cross sectional view taken on the line 5—5 in Fig. 2.

Fig. 6 is a side elevational view of the foundation plate and appurtenant parts.

Fig. 7 is a side elevational view of the carriage.

Fig. 8 is a similar view of the dynamometer table; and

Fig. 9 is a side elevational view of a detail.

Referring more particularly to the drawings, 1 designates a table or work holder adapted to receive the work upon which the milling tool is to operate. End bearings 2 and 3, and an intermediate bearing 4 thereon, provide for mounting the work table 1 for oscillating movement about the shaft 5.

Pins 6 and 7 pass through end bearings 8 and 9, formed on a carriage 10, and the ends of the shaft 5 to hold such shaft against rotation and relative endwise movement in said bearings. A ball thrust bearing 11 is interposed between the bearings 2 and 8, as shown clearly in Figs. 1 and 3, for transmitting axial movement from the table 1 to the carriage 10 for a purpose hereinafter described. The carriage 10 is also provided with intermediate bearings 12 and 13 fitting about said shaft 5 for the purpose of steadying and lessening the vibration thereof during the operation.

Adjacent the bearings 8 and 9 on the carriage 10 are other end bearings 14 and 15, and in alinement with such end bearings are also intermediate bearings 16 and 17; such bearings receiving a shaft 18 journaled to rock in bearings 19, 20 and 21 on a foundation plate 22. Pins 23 serve to lock the carriage 10 and shaft 18 against relative rotation and cause said shaft 18 to be rocked in the bearings 19, 20 and 21 when the carriage 10 is oscillated. Openings 24 are made in the foundation plate 22 to receive bolts 25 which appear in Figs. 4 and 5, and which serve to connect said foundation plate to the T-slots in the table of the milling machine which is represented at 26.

A gage, designated generally at A, is composed, in the instance shown, of a plunger 27 fitted to move in a cylinder or box 28 and having connected thereto a diaphragm 29, the outer edge of which is held against the top of the box 28 by a ring 30. Shoulders 31, formed on rods 32, bear against said ring 30, and cause the ring to bind tightly on the outer edge of the diaphragm 29 by reason of the pressure exerted thereon by nuts 33 threaded on the ends of the rods 32 which project through the cylinder or box 28; for which see Fig. 2.

The cylinder or box 28 is in communication with a pressure gage with dial (not shown) by a connection made through an opening 34 appearing in Fig. 1.

Perforated lugs 35 are provided on the bearing 19 to receive the other ends of the rods 32 to form a support for the gage and to hold the cylinder or box 28 thereof stationary. A spindle 36, adjustable through a turn buckle 37, is provided with the conical ends 38 and 39 engaging correspondingly shaped sockets in the centers of the plunger 27 and shaft 18, respectively. Such spindle 36 is adapted to receive the endwise thrust of the shaft 18 and communicate such thrust to the plunger 27 whereby the pressure of the thrust may be registered on the dial carried by the gage box 28.

An upstanding flange 40 on the table 1 provided with spaced and vertically elongated perforations 41, is disposed near to a similar upstanding flange 42 on the carriage 10 having similar elongated perforations 43 in alinement with said perforations 41, the edges of the perforations being preferably concave, as indicated at 44. Rods 45 pass through the perforations 41 and 43, and are attached to the cylinder or box 46 of a second gage indicated generally at B. A pressure gage with dial 47, shown in Fig. 4, communicates with the gage box 46 by a connection 48. The plunger of the gage B is connected by an adjustable spindle 49, having preferably conical ends, with the flange 40 on the table 1; said spindle 49 passing through a vertically elongated opening 50 made in the upstanding flange 42 of the carriage 10 midway between the perforations 43.

Convex shoulders 51 on the rods 45 bear at one side in the concave edges of the perforations 43, as indicated in Fig. 2, while a similarly convex shoulder 52 on the adjustable spindle 49 bears on the opposite side of said flange 42. There are also convex shoulders 53 held by nuts 54 threaded on the ends of the rods 45 against the concave edges 44 of the perforations 41 in the flange 40. The relative movement between the table 1 and carriage 10, occasioned by the rocking of the table about the shaft 5, will cause the rods 45 to be drawn through the perforations 43 of the flange 42, while the convex shoulder 52 holds the spindle 49 stationary; so that the box 46 of the gage B will be compressed on the plunger and diaphragm and cause the fluid therein to pass up through the connection 48 and actuate the index or pointer of the gage 47, which will show the degree of this relative movement.

The foundation plate 22 in Fig. 6 is shown provided with an arm or plate 55, which extends diagonally therefrom, for which see Fig. 5, and is supplied with perforations 56 to receive rods 57 attached to the cylinder or box 58 of a third gage C. This gage is of any suitable type, being here shown similar in construction to the gage A above described and having the plunger 59 and the diaphragm 60, together with a dial and index 61 and 62, respectively, communicating with the box 58 through the connection 63. A similar adjustable spindle 64 is connected to the center of the plunger 59 and passes through a perforation 65 made in the arm or plate 55. Both the rods 57 and adjustable spindle 64 connect in a manner which will now be readily understood with a second armor plate 66 having the perforations 67 and the socket 68.

Bearings 69 on the plate or arm 66 are fitted to loosely rock on the shaft 18 and carry therewith other arms 70 extending at substantially right angles to the plate 66, and being formed with bearings 71 to be loosely received over the shaft 5. The plate 66, arms 70, and the bearings 69 and 71 form, in effect, a lever which is rocked consequent upon the depression of the table 1. This rocking movement is communicated and registered by the gage C through the rods 57 connected to the gage box 58, which draw said box against the plunger 59 held fixed by the convex shoulder 72.

At 73 in Fig. 3, is shown a thrust bearing engaging against one end of the central bearing 20 on the foundation plate 22, and having its other end in engagement with one of the bearings 69 on the plate 66 in order to hold such plate fixed when the shaft 18 is shifted axially.

The operation of the invention is substantially as follows:

The improved dynamometer, supported on the foundation plate 22, is placed upon the usual table 26 of a milling machine and attached thereto by the bolts 25. Work is thereupon placed on the auxiliary table 1 of the dynamometer and made fast thereto by T-headed bolts similar to the bolts 25. The work and milling cutter are then brought together and the tool put into operation.

The resultant motion of the cutting tool and the resultant pressure exerted thereby on the work upon the table 1 may be resolved into three components, each one being at right angles to the other two.

Referring to Fig. 5, the horizontal arrow $x$ pointing in the right hand direction, indicates the direction of one of such components; and the vertical arrow $y$ pointing downwardly through the table 1, indicates a second component. The direction of the third component is designated by the arrow $z$ in Fig. 3 pointing in the left hand direction. The resultant pressure imposed by the cutting tool on the work is adapted to be split up into its three components by my improved dynamometer, and the degree of the pressure in each component direction singly registered on separate gages so that it may be quickly and accurately determined with the aid of these pressures known as to what strength will be required of all parts of the milling machine framework. The pressure exerted in the direction of the arrow $x$ in Fig. 5, will tend to rock the table 1 in a clockwise direction about the shaft 5 without affecting the carriage 10. In executing this movement the table 1 will draw its flange 40 away from the flange 42 on the carriage 10 and draw the rods 45 and gage box 46 connected thereto in a manner to cause the liquid therein to be driven up through the connection 48 and into the dial 47 in an amount proportionate to the amount of the pressure exerted. The index on the dial 47 will consequently be moved to a corresponding extent to indicate the degree of such pressure.

Referring to the component exerted by the cutting tool on the work in the direction of the arrow $y$ in Fig. 5, the pressure exerted thereby on the table through the work will cause the table to descend, carrying therewith the bearings 71 and rocking the plate 66 about the shaft 18. As the plate 66 is moved away from the plate or arm 55 on the foundation plate 22, the rods 57 of the gage C will cause the compression of the gage box 58 on the plunger 59, driving the fluid therein up through the connection 63 to the dial 61. The amount of this pressure will be indicated by the position of the index 62. The pressure exerted in the direction of the arrow $z$ in Fig. 3, will operate to shift the table 1 carrying the work longitudinally. This longitudinal movement will be communicated to the carriage 10 through the thrust bearing 11 and pins 6 and 7, and in turn, by reason of the fast connection with the shaft 18 of the carriage 10 made by the pins 23, such shaft 18 will be axially shifted in the bearings 19, 20 and 21 of the foundation plate 22. When so moved the shaft 18 will drive before it the spindle 36 and plunger and diaphragm 27 and 29, causing the fluid in like manner to actuate the gage connected therewith.

It is obvious that those skilled in the art may vary the details of construction and arrangements of parts without departing from the spirit of my invention, and therefore I do not wish to be limited to such features except as may be required by the claims.

I claim:

1. In combination with a milling machine having the usual table, of a dynamometer including an auxiliary table for receiving the work operated upon by the milling tool and adapted to move in response to the pressure exerted upon the work by such milling tool, means whereby said auxiliary table may be supported from the milling machine table, and a gage in operative relation to said table for registering the degree of the pressure imposed by the cutting tool on the work transmitted through said table, substantially as described.

2. In combination with a milling machine having the usual table, of a dynamometer including an auxiliary table for receiving the work operated upon by the cutting tool and adapted to be moved in different directions in response to the different pressures exerted by the cutting tool on the work, means whereby said auxiliary table may be supported from the milling machine table, and gages for separately registering the different movements of said table to indicate the degree of the pressure transmitted from the cutting tool, substantially as described.

3. A dynamometer for milling machines including a table for receiving the work operated upon by the cutting tool and being movable in response to the three component pressures exerted on the work by such cutting tool, and three separate gages in operative relation to said table and adapted to register separately the three component pressures of the cutting tool transmitted to the table, substantially as described.

4. A dynamometer for milling machines including a tilting table for receiving the work operated upon by the milling cutter, and a gage arranged to be affected by the tilting movement of such table to register the pressure of the cutting tool upon the work, substantially as described.

5. A dynamometer for milling machines including a depressible table for holding the work operated upon by the milling cutter and adapted to be depressed in response to the pressure imposed by the cutting tool on such work, and a gage arranged to be affected by the depression of said table to register the pressure of the cutting tool on the work, substantially as described.

6. In combination with a milling machine having the usual table, of a dynamometer including an auxiliary table for holding the work operated upon by the milling cutter and adapted to be translated in response to the pressure exerted upon the work by such milling cutter, means whereby such auxiliary table may be supported from said milling machine table, and a gage affected by the translation of said table to register the pressure of the cutting tool on the work, substantially as described.

7. A dynamometer for milling machines including a tiltable and depressible table for holding the work operated upon by the milling cutter, a gage arranged to be affected by the tilting movement of the table to register the pressure of the cutting tool in one direction, and a second gage arranged to be affected by the depression of said table whereby to register the pressure of the cutting tool in a second direction, substantially as described.

8. A dynamometer for milling machines including a table for holding the work operated upon by the milling cutter and adapted to be oscillated and translated by different components of the pressure exerted by the milling cutter on the work, and gages arranged to be separately affected by the oscillating and translating movement of said table to independently register the separate components of the milling cutter pressure, substantially as described.

9. A dynamometer for milling machines including a table for receiving the work operated upon by the milling cutter and adapted to be depressed and translated by different components of the pressure exerted by the milling cutter on the work, and gages arranged to be separately affected by the depression and translating movement of said table to individually indicate the different components of the milling cutter pressure, substantially as described.

10. A dynamometer for milling machines including a rocking table for holding the work operated upon by the cutting tool and adapted to be depressed and translated in response to various components of the pressure imposed by the cutting tool on the work and gages arranged to be independently affected by the rocking, depression and translation of said table to separately register the various components of the cutting tool resultant pressure, substantially as described.

11. In combination with a milling machine table, of a dynamometer including a base adapted to be removably attached to said milling machine table, and a work holder supported for movement on said base and arranged to receive the pressure exerted by the milling cutter on such work, and means in connection with said work holder for registering the degree of movement thereof, substantially as described.

12. In combination with a milling machine table, of a dynamometer including a base adapted to rest on the milling machine table, means for firmly and removably securing said base to said table, a work holder mounted on said base and adapted to execute a variety of movements, and gage means arranged in connection with said work holder and adapted to be affected consequent upon the movements executed by said work holder, substantially as described.

13. A dynamometer for milling machines including a base, a shaft supported from said base, a work holder journaled to oscillate on said shaft, and a gage connected to said work holder for measuring the oscillating movement thereof, substantially as described.

14. In combination with a milling machine table, of a dynamometer including a base, means for firmly and removably securing said base to said table, a shaft journaled on said base, a work holder arranged to be supported from said shaft and to have a depressible movement thereabout, and a gage adapted to be acted upon when the work holder is depressed to indicate the degree of the depression, substantially as described.

15. In combination with a milling machine having the usual table, of a dynamometer including a base, means for firmly and removably securing said base to said table, an axially movable shaft supported by said base, a work holder connected to move said shaft, and a gage acted upon by said shaft to indicate the degree of movement thereof, substantially as described.

16. A dynamometer for milling machines including a base adapted for attachment to the milling machine, an axially shiftable shaft supported by said base, a work holder adapted to oscillate about said shaft and to impart axially shifting movement thereto, a gage for measuring the degree of the axial movement of said shaft, and a second gage for measuring the degree of the oscillating movement of said work holder, substantially as described.

17. A dynamometer for milling machines including a base adapted for attachment to the milling machine, a shaft journaled on said base, a work holder, a second shaft supporting said work holder for tilting movement thereabout, means for supporting said second shaft for oscillating movement about said first-named shaft, a gage for measuring the tilting movement of said work holder about said second shaft, and a separate gage for indicating the movement of said work holder occasioned by the oscillation of said second shaft about said first-mentioned shaft, substantially as described.

18. A dynamometer for milling machines including a base adapted for attachment to the milling machine, an axially movable shaft journaled on said base, a second shaft supported for oscillation about said first-named shaft, a work holder having a tilting movement about said second-named shaft and a downward movement when said second shaft oscillates about said first-mentioned shaft, a gage for measuring the axial movement of said first-named shaft, a separate gage for measuring the tilting movement of said work holder, and a third gage for measuring said downward movement of said work holder, substantially as described.

19. A dynamometer for milling machines, including a base adapted for attachment to the milling machine, a carriage adapted to oscillate on said base, a work holder having an independent rocking movement with respect to said carriage, a gage adapted to measure the independent rocking movement of said work holder with respect to said carriage, and means for measuring the simultaneous oscillating movement of the work holder and carriage, substantially as described.

20. A dynamometer for milling machines including a base adapted for attachment to the milling machine, a longitudinally shiftable and oscillatable carriage mounted on said base, a work holder longitudinally shiftable and oscillatable in accompaniment to said carriage and having an independent rocking movement with reference to said carriage, a gage for measuring the longitudinal movement of said carriage and work holder, a second gage for measuring the oscillating movement of said carriage and work holder, and a third gage for measuring the independent rocking movement of said work holder, substantially as described.

21. A dynamometer for milling machines including a base adapted for attachment to the milling machine, an oscillating and axially slidable shaft journaled on said base, a gage for measuring the sliding movement of said shaft, a carriage fixed to said shaft, a second shaft supported in said carriage and oscillating and sliding therewith, a work holder oscillating with said carriage and second named shaft and having an independent rocking movement about said second named shaft, and separate gages for measuring the oscillating and rocking movement of said work holder, substantially as described.

22. A dynamometer for milling machines including a base, a carriage supported on said base, a work holder having an independent rocking movement with respect to said carriage, flanges upon said carriage and work holder, and a gage connected to said flanges for measuring the rocking movement of said work holder, substantially as described.

23. A dynamometer for milling machines including a base, a plate on said base, a work holder having an oscillating movement with reference to said base, a second plate mounted adjacent said first-named plate and adapted to be shifted with respect thereto when said work holder is oscillated, and a gage connected between said plates for measuring the movement of said work holder, substantially as described.

24. A dynamometer for milling machines including a base, a plate on said base, a carriage mounted for oscillating movement on said base, a work holder oscillating with and having an independent rocking movement with respect to said carriage, flanges on said carriage and work holder, a gage connected between said flanges for measuring the independent rocking movement of said work holder, a movable plate mounted opposite said first-named plate, a gage connected between said plates, and means connecting said movable plate to be shifted when the table oscillates together with said carriage, substantially as described.

25. A dynamometer for milling machines including a base, a rotatable and axially shiftable shaft journaled on said base, a carriage fixed to oscillate and move axially with said shaft, offset bearings on said carriage, a second shaft fixed against rotation and axial movement in said bearings, a work holder mounted to rock about said second-named shaft and to oscillate with said carriage about said first-named shaft, and gages for measuring the several movements executed by said work holder and carriage, substantially as described.

In testimony whereof, I affix my signature.

ROUVIME POLIAKOFF.